May 24, 1966  J. E. FREDERICK  3,253,118
WELDING APPARATUS AND METHOD OF WELDING
Filed April 7, 1964  3 Sheets-Sheet 1

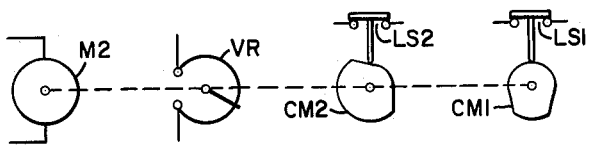
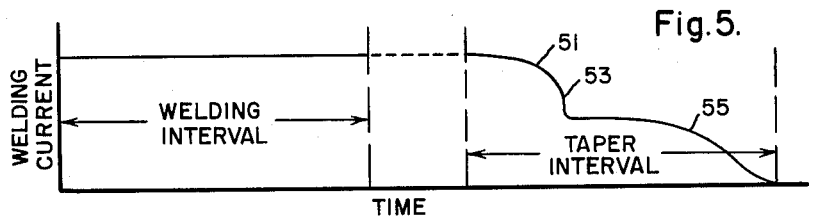
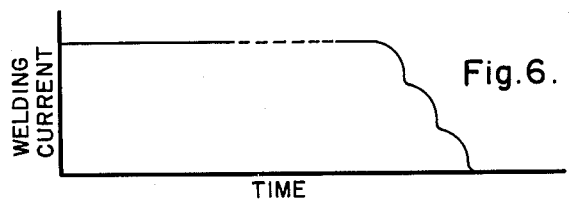
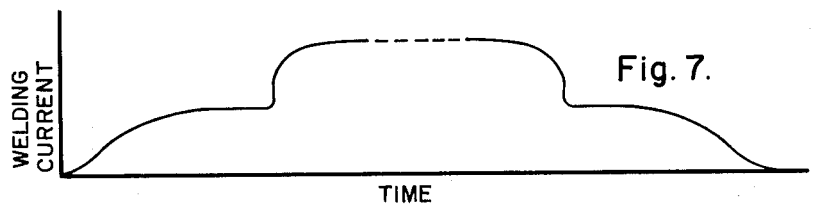
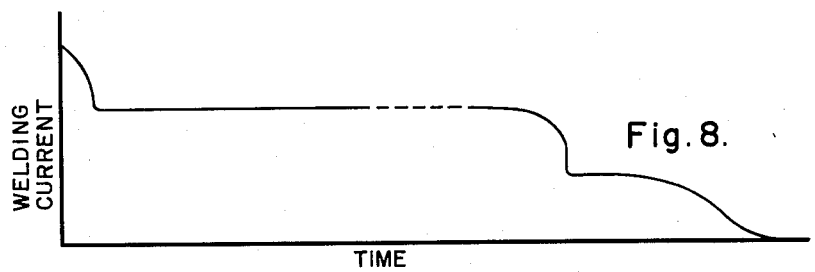

United States Patent Office 3,253,118
Patented May 24, 1966

3,253,118
WELDING APPARATUS AND METHOD OF WELDING
James E. Frederick, Clarence, N.Y., assignor to Westinghouse Electric Corporation, Pittsburgh, Pa., a corporation of Pennsylvania
Filed Apr. 7, 1964, Ser. No. 357,897
6 Claims. (Cl. 219—131)

This invention relates to the arc-welding art and has particular relationship to the supply of power for welding. This application is in the interest of clarity confined to arc welding, to which this invention is particularly applicable but the reference herein to arc welding is intended to include within its scope arc melting to the extent that this invention is applicable to arc melting.

In arc welding it is desirable that the crater at the end of the weld be suppressed to increase strength of the welded joint. This object is achieved in accordance with the teachings of the art by reducing the welding current at the end of the weld. Typically, the current is tapered off gradually as the end of the weld is approached; the tapering is so set as to fill the hole or crater which would otherwise be present. In apparatus in accordance with the teachings of the prior art the crater is suppressed by increasing impedance in the circuit which supplies the welding current during the current-tapering interval. For this purpose a costly complex mechanism for moving a core or related massive apparatus is necessary. Typically a magnetic core leg may be moved by a motor to increase the impedance of a reactor which controls the current.

It is an object of this invention to provide apparatus of relatively simple and low cost structure for tapering off the welding current at the end of a weld to suppress the crater. Another object of this invention is to provide a method of welding which lends itself to the use of relatively simple and low cost apparatus for suppressing the crater at the end of a weld.

In accordance with this invention welding apparatus is provided which includes a power source and a bank of impedance units. The welding arc between the electrode and work is supplied with current from this source through this bank. The impedance in the bank determines the welding current. To set the welding current to meet different welding demands the bank includes selecting means or mechanism for selectively connecting selected impedance units of the bank in a parallel network in the welding current circuit.

Each impedance unit of the bank has at least two discrete settings: a higher impedance setting and a lower impedance setting and readily-operable switch means is provided for converting each unit from one setting to the other. Thus by selectively setting the selecting mechanism certain impedance units are interposed in the welding circuit to determine the welding current. The switch means may then be set during the welding operation to include these units in the welding circuit either in their low impedance setting or in their high impedance setting.

In the practice of this invention in its specific aspects the units are selected in accordance with the demands of the welding operation and are during normal welding maintained in the low-impedance setting so that adequate welding current is delivered to the work. Near the end of the welding operation the switch means is operated to set the units in their high-impedance setting and the welding current is tapered off in a simple manner to suppress the crater.

In accordance with an important preferred aspect of this invention the impedance bank is connected in series between the supply and the work. In accordance with this invention in its broader aspects the impedance bank may be connected in other ways. For example, the bank may be connected in parallel with the electrode and work; a resistor must be connected in series with the network including the bank and the electrode and work. In this case the impedance units in the bank are set in their high-impedance setting during normal welding and in their lower-impedance setting during the tapering-off interval.

In accordance with a further aspect of this invention the bank includes a continuously variable impedance. This impedance is power driven and the drive includes facilities for converting the discrete impedance units from one impedance setting to the other at selectable impedance magnitudes of the continuously variable impedance. Apparatus in accordance with this aspect of the invention permits the decrease of the welding current during the taper-off interval in predeterminable steps.

For a better understanding of this invention, both as to its organization and as to its method of operation, together with additional objects and advantages thereof, reference is made to the following description of a specific embodiment taken in connection with the accompanying drawings, in which:

FIGURE 4 is a diagrammatic view showing the drive for the continuously variable impedance included in the apparatus shown in FIGURE 1; and FIGURES 5, 6, 7 and 8 are graphs showing different ways in which the welding current may be varied in the practice of this invention.

Figure 1:
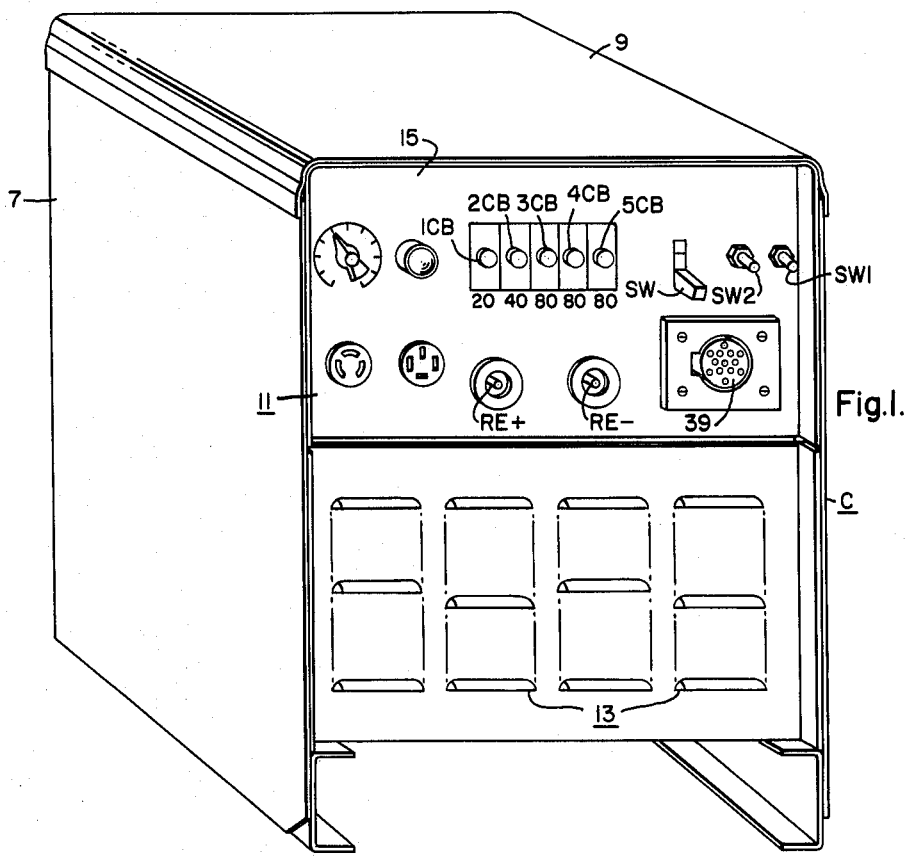
FIGURE 1 is a view in perspective showing apparatus in accordance with this invention particularly suitable for the practice of the method of this invention.

The apparatus shown in the drawings includes a Power Supply and a Control. The Power Supply and the Control are connected in a cabinet C. This apparatus is supplied with power from a polyphase supply typically of the 220 or 440 volt type through conductors L1, L2 and L3 which may be connected to the mains through a disconnect DI. The welding current is derived from transformer T through rectifier RX. For controlling purposes, power is derived from an auxiliary transformer 2T, the primary 2P of which is adapted to be energized from the conductors L2 and L3 through switch SW. The secondary 2S of transformer 2T has a number of terminals X1, X2, X3, X4 defining winding sections from which various voltages may be derived.

Figure 2:
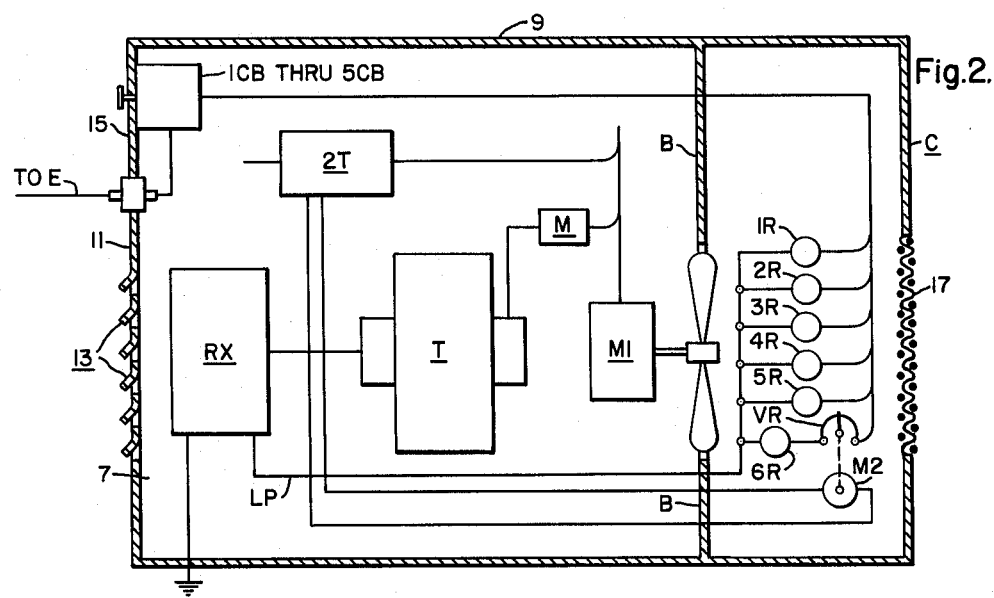
FIGURE 2 is a diagrammatic view showing the arrangement of the components of the apparatus shown in FIGURE 1.
Figure 3:
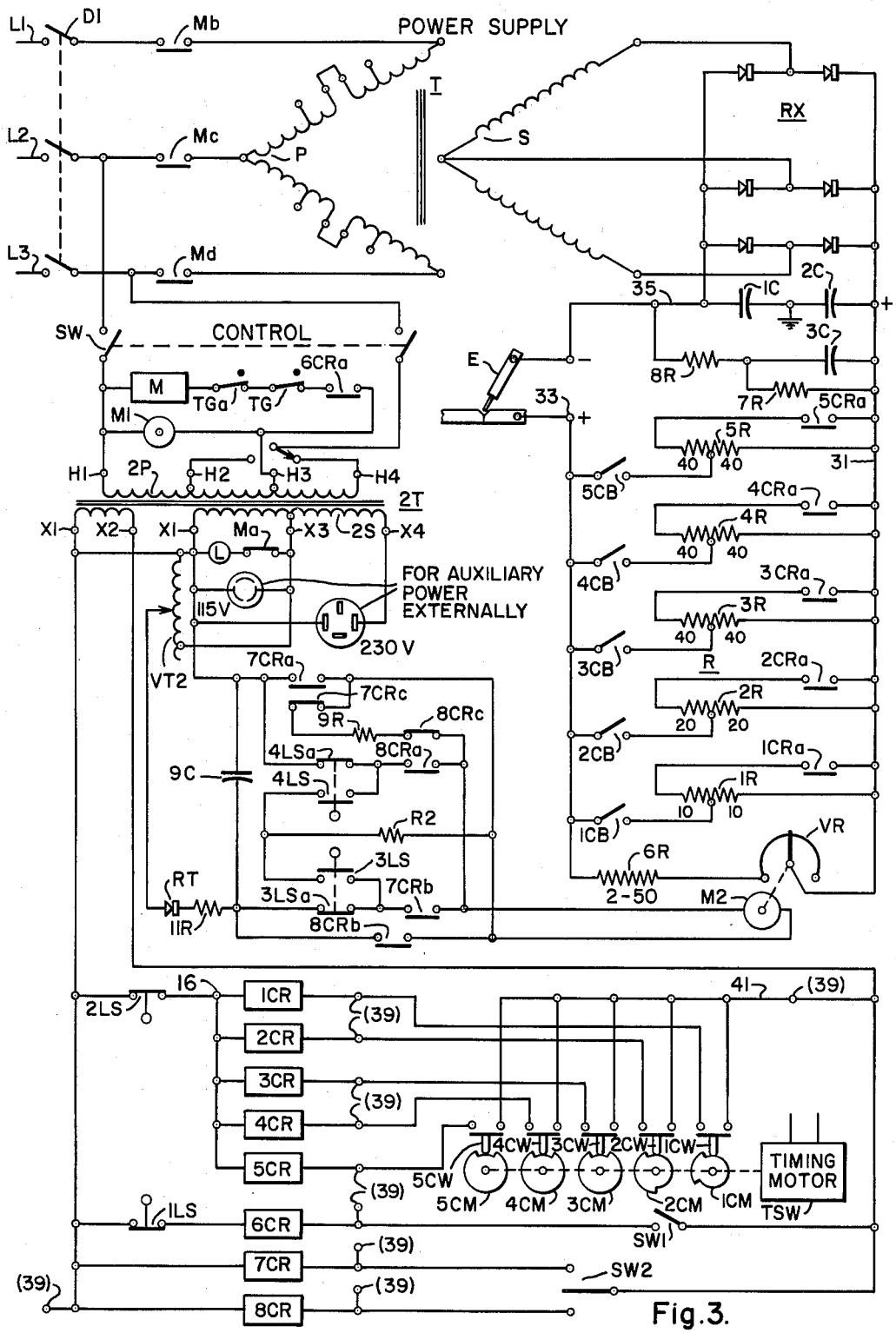
FIGURE 3 is a schematic of the apparatus shown in FIGURE 1.

The cabinet C has sheet-metal side walls 7 and a sheet-metal top 9. The front 11 of the cabinet C has louvers 13 in the lower portion and has a panel 15 with mechanisms by means of which an operator can set the apparatus for welding. The rear wall of the cabinet C includes an open work 17 (FIGURE 2).

Within the cabinet C there is apparatus for supplying power to weld work W with an electrode E. This apparatus includes a transformer T, the rectifier RX, and the bank R of resistors. The bank R is disposed adjacent the open work 17 and the resistors are cooled by a fan F driven by motor M1. The fan F causes air to flow over the resistors of bank R. The air enters through the louvers 13 and flows out through the open work 17. The air is guided by a baffle B included within cabinet C near bank R. Cooling air flows over the rectifier RX and the transformer T before it is drawn over the bank R but the rectifier and transformer raise the temperature of the air only by about 10 Fahrenheit degrees so that the air flowing over the bank R effectively cools this bank.

The transformer T in the Power Supply includes an open-delta primary P. The terminals of this primary are connected to the conductors L1, L2 and L3 through the contacts Mb, Mc and Md of a contactor M. The coil of the contactor M is adapted to be connected between conductors L2 and L3 through the back contact TGa of a thermal-element, which is located in the transformer T and through the front contact CRa of a relay 6CR in the Control. The secondary S of transformer T is also of the open-delta type and is connected to supply the rectifier RX which is preferably a silicon-diode bridge. In accordance with the broader aspects of this invention rectifiers of other types, such as selenium rectifiers, may be used. The positive and negative output terminals of the bridge are shunted by capacitors 1C and 2C which are grounded at their junction and by a network including a series resistor 8R and capacitor 3C shunted by a resistor 7R. The purpose and function of this network across the output terminals of the rectifier RX are described in a patent 3,125,703, granted March 17, 1964, to Martin Rebuffoni et al.

The Power Supply includes the bank R. This bank includes a plurality of resistor units 1R, 2R, 3R, 4R, 5R each of which is capable of being set in the bank R at two resistor magnitudes. For this purpose each of the resistors 1R through 5R is center-tapped; for the lower magnitude the halves of the resistor are connected in parallel in the bank while for the higher magnitude only one-half of the resistor is connected in the bank. The parallel connection provides substantially smaller resistance than the series connection.

The resistors 1R through 5R may be selectively connected in the bank in either setting to conduct welding current in parallel by selectively closing one or more of the switches or circuit breakers 1CB, 2CB, 3CB, 4CB and 5CB. Each circuit breaker connects the resistor which has the label with its number. The circuit breakers 1CB through 5CB have knobs on the panel 15 of the cabinet C and may be selectively set by operating these knobs.

The settings of the resistors at low or high resistance is determined by the condition of the front contacts 1CRa, 2CRa, 3CRa, 4CRa and 5CRa of relays 1CR through 5CR. Each resistor is controlled by a relay bearing a label with its number. With any of the relays 1CR through 5CR actuated the resistance halves 1R through 5R, respectively, are connected in parallel and the resistance is low; with the relays 1CR through 5CR unactuated only the right-hand portion of the resistors 1R through 5R is connected in the bank R and the resistance is substantially higher.

The bank R also includes a branch consisting of a fixed resistor 6R and a continuously variable resistor VR. The resistor VR is preferably tapered and its movable arm is driven by a motor M2 which operates to vary the resistance continuously. The drive shaft of the motor which rotates the arm of the resistor VR carries cams CM1 and CM2 (FIG. 4), the angular positions of which may be adjusted. Cams CM1 and CM2 operate limit switches 1LS and 2LS, respectively. The cams CM1 and CM2 may be set to operate the limit switches 1LS and 2LS at selected angular positions in the rotation of the drive shaft and thus at selected points along the resistor VR. 2LS is opened first and thereafter 1LS is opened. Usually, the cam CM1 controlling 1LS is set so that 1LS is opened when all of the resistance VR is connected in the bank R.

For convenience in understanding the operation of the Power Supply the current conducted through each of the resistor branches 1R through 5R and 6R and VR of the bank R is indicated below each of the resistor branches. Thus, depending on the setting of VR the branch of the bank R including resistor VR can conduct between 2 and 50 amperes. Fifty amperes is conducted with VR set at zero and 2 amperes with VR completely connected in the circuit. Resistor 1R conducts 10 amperes through each half and thus a total of 20 amperes. The current normally conducted on the closing of each circuit breaker 1CB through 5CB appears below each circuit breaker on the panel 15 of the cabinet C.

The bank is connected to the supply with its resistors 1R through 5R and 6R and VR in parallel. One terminal of the bank R is connected to the positive output terminal 31 of the rectifier RX. The other terminal 33 of the bank R then constitutes the positive terminal of the Power Supply. The negative terminal 35 of the rectifier RX constitutes the negative terminal of the Supply. These are connected to receptacles RE+ and RE— to which the electrode E may be selectively connected. In the usual practice of this invention, the electrode E is connected to one of these receptacles RE+ and RE— depending on whether the welding is at straight polarity or at reverse polarity and the work W is grounded as is the other receptacle RE— or RE+.

The Control includes the relays 1CR through 6CR which control the resistance in the bank and additional relays 7CR and 8CR. These relays 7CR or 8CR may be selectively energized from the section X–X2 of 2T through switch SW2 to change the resistance VR in opposite directions. When SW2 is set so that 7CR is energized the resistance VR is increased and when SW2 is set so that 8CR is energized the resistance through VR is decreased.

The relays 1CR through 6CR each has the front contact 1CRa through 6CRa. The relays 7CR and 8CR each has front contacts 7CRa and 7CRb and 8CRa and 8CRb and back contacts 7CRc and 8CRc respectively.

The coil of relay 6CR is adapted to be energized from a section X1–X2 of the secondary 2S through the limit switch 1LS which is normally closed. The coils of 1CR through 5CR may be energized from the section X1–X2 of a secondary of 2S through the limit switch 2LS simultaneously or in a predetermined sequence. For the latter purpose one terminal of each of the coils is connected to a cam operated timing switch TSW.

The coils 1CR through 5CR have a common terminal 16 connected to one terminal of the section X1–X2 of 2S through the limit switch 2LS. The other terminal of each of the coils 1CR through 5CR is connected to a jack of a multi-terminal receptacle 39. The receptacle 39 connects the separate jacks of the receptacle, to which the coils 1CR through 5CR are connected to be controlled by the timing switch TSW on a separate panel or cabinet. The switch TSW includes a plurality of cam-controlled switches 1CW through 5CW. The switches 1CW through 5CW have a common connection 41 to the remaining terminal, X2, of the section X1–X2 of 2S and may be operated in a predetermined timed sequence to permit the coils 1CR through 5CR to be energized simultaneously.

The motor M2 is adapted to be energized from the section X1–X3 of S2 through variable transformer VT2. The motor M2 is of the variable-speed direct-current type and is essentially supplied through a rectifier RT and a filter including 11R and capacitor 9C. For convenience the motor may be regarded as supplied from the capacitor 9C. With relay 7CR actuated, 9C is charged in a circuit extending from the adjustable arm of the variable transformer VT2, through rectifier RT, resistor 11R, the capacitor 9C to the upper terminal of VT2. The charge on capacitor 9C supplies current to the motor in a circuit extending from the positive plate of the capacitor through the normally closed contact 3LSa of a limit switch 3LS, the contact 7CRb, the armature, the contact 7CRa to the negative plate of the capacitor. When the motor is to operate in the opposite direction, relay 8CR is actuated and the capacitor 9C is charged. In this case, the capacitor is charged similarly but supplies the motor in a circuit extending from the positive plate through 8CRb, the armature, 8CRa, the normally closed contact 4LSa of limit switch 4LS to the negative plate of the capacitor.

Preparatory to the welding operation the apparatus is set with the resistor VR in the zero resistance setting. In addition, the timer TSW which controls the operation of the relays 1CR through 5CR is set. In a typical situation TSW is set with all of the switches 1CW through 5CW closed so that the relays 1CR through 5CR operate together. To set the apparatus for welding, selected ones of the circuit breakers 1CB through 5CB are closed. The disconnect D1 is closed to energize conductors L1, L2, L3; SW is closed energizing the transformer 2T. The relays 1CR through 6CR are then actuated through the secondary 2S. The contactor M is energized closing Mb, Mc, Md, energizing transformer T. The switch SW2 is now set to energize 7CR; motor M2 then rotates to set the resistor VR in the zero resistance position. The switch SW2 may be left in this position, the motor M2 stops when it operates limit switch 3LS.

The operator now brings the electrode into welding relationship with the work, firing an arc and starting the welding. At this point the resistance in series with the closed circuit breakers 1CB through 5CB is low and the welding proceeds with the resistors so set. Near the end of the welding operation the operator sets the switch SW2 in the opposite position so as to energize relay 8CR. The motor M2 is then energized in the opposite direction increasing the resistance of VR. The welding current then decreases as represented by the portion 51 of the curve in FIGURE 5 which extends from the constant current portion and indicates a decrease in the current. In this curve welding current is plotted as a function of time. The resistor VR continues to increase in this way until the limit switch 2LS on its shaft is operated by the associated cam CM2. At this point all of the relays 1CR through 5CR are deenergized and the resistance in series with the arc between electrode E and work W is materially increased. This increase in resistance results in a sudden drop in the welding current represented by the substantially vertical line 53 in FIGURE 5. The resistor VR continues to increase as represented by the sloping part 55 of the curve in FIGURE 5 until limit switch 1LS is operated opening the circuit through 6CR. The contactor M is now opened and the welding operation is at an end.

Where it is desired that the welding current during the tapering off interval be decreased in steps, the timer TSW may be operated so that the cams 1CM through 5CM opens switches 1CW to 5CW in sequence. The relays 1CR through 5CR are then opened in a predetermined sequence gradually decreasing the current. Preferably the sequence should be such that the resistors in circuit with the arc, which are of higher resistance, are increased first and the lower resistances are increased in this case during the latter part of the operation. The variation of the welding current as a function of time is shown in FIGURE 5.

This invention in its broader aspects may serve to control the rate of rise as well as the rate of decay of the welding current. In this case the relays 1CR through 5CR and the resistor VR are controlled from a sequencer. Typically at the start of a weld VR might be decreased from its maximum magnitude and then 1CR through 5CR actuated to raise the current, in a controlled manner, to welding magnitude. At the end of a weld the reverse operation is carried out to reduce the current at a controlled rate. The welding current may also be reduced from an initial high magnitude to welding magnitude. For this purpose VR may be increased or some relays of 1CR through 5CR may be removed from the circuit. Typical curves are shown in FIGURES 6, 7 and 8.

While a preferred embodiment of this invention has been disclosed herein, many modifications thereof are feasible. This invention then is not to be restricted, except insofar as is necessitated by the spirit of the prior art.

I claim as my invention:

1. Arc welding apparatus for welding work including power source means, variable impedance means, said variable impedance means including a plurality of separate impedances, each impedance having a higher magnitude and a lower magnitude, means connecting said source means and said variable impedance means in a welding current supply circuit with said work with said separate impedances connected as separate parallel branches to conduct predetermined portions of the welding current, said connecting means including selective switch means in each said branch to connect the corresponding impedance to, or disconnect said corresponding impedance from, said circuit, the current in said circuit having welding magnitude with said separate impedances set at their lower magnitudes and having crater-less weld terminating magnitude with said impedances set at their higher magnitudes, and selectively actuable switch means for converting the setting of said impedances from one of said magnitudes to the other.

2. Arc welding apparatus for welding work including a power source, a bank of separate impedance units connected in parallel, each unit having a higher impedance setting and a lower impedance setting, switch means connected to each unit for converting said unit from one of said settings to the other, means connected to said bank and to said source for connecting said source and said bank in a welding-current supply circuit with said work with said bank in welding current determining relationship in said circuit, said connecting means including means for including in said circuit only selected ones of said impedance units, and selectively operable means for operating said switch means to convert the selected ones of said impedance units from one setting to the other, said selected ones of said units being set for normal welding in a welding operation in one of said settings and for crater-less termination of said welding operation in said other setting.

3. Arc welding apparatus for welding work including a power source, a bank of separate impedance units, certain of said units having only discrete magnitudes including at least a lower magnitude and a higher magnitude and at least one of said units being variable continuously from a lower magnitude to a higher magnitude, said bank including means for connecting selected ones of said units in said bank and disconnecting other of said units from said bank, means connected to said bank and to said source for connecting said bank and source in a welding current supply circuit with said work with said selected ones of said units in welding current determining relationship, in said circuit, means connected to said one unit for varying its impedance between said lower and higher magnitudes, and means responsive to said varying means during its varying operation for converting said selected ones of said units from one said discrete magnitude to the other.

4. The method of arc-welding work with a power source with impedance means connectable between the power source and the work to determine the welding current, said impedance means having connections for establishing different impedance magnitudes, the said method comprising selectively presetting said impedance means at first and second impedance magnitudes selectably connectable in circuit with said source and work, current at which the welding of said work may be carried out being delivered to said work with said first impedance magnitude connected to said source and work and current of a substantially lower magnitude being delivered to said work with said second impedance magnitude connected to said source and work, connecting said impedance means in circuit with said source and work at said first impedance magnitude and producing an arc at said work and welding said work, near the end of the said welding connecting said impedance means at said second magnitude in lieu of said first magnitude to said source and work and terminating the welding with said impedance means at said second magnitude, the current produced at said second magnitude being such as to suppress a crater at the end of said weld.

5. The method of arc-welding work with a power source with impedance means connectable between said source and said work to absorb the difference between the open-circuit voltage of said source and the arc voltage, said impedance means having connections for establishing different impedance magnitudes, the said method comprising selectively presetting said impedance means at first and second impedance magnitudes selectably connectable to said source and work, said first magnitude being such that welding current will be transmitted to said work when said impedance means is connected at said first magnitude to said source and work, and said second magnitudes being such that current of substantially lower magnitude than welding current will be transmitted to said work when said impedance means is connected at said second magnitude to said source and work, connecting said impedance means at said first magnitude to said source and work, producing an arc at said work with said impedance means so connected and carrying out a welding operation, near the end of said welding operation connecting said impedance means at said second magnitude to said source and work, to reduce the current to said lower magnitude, and after said impedance means has been so connected at said second magnitude, continuing the welding operation while gradually increasing the voltage absorption of the impedance means in circuit with said source and work until the arc is extinguished.

6. Arc welding apparatus for welding work comprising power source means for supplying welding current impedance means, said impedance means having connections for establishing different impedance magnitudes, means connecting said source means and said impedance means in current supply relationship with said work with said impedance means in current-determining relationship between said source means and said work, selective means connected to said impedance means for presetting said impedance means at first and second magnitudes, and switch means connected to said impedance means selectively operable to connect said impedance means to said source and work at said first magnitude or at said second magnitude, the arc current to said work at said first magnitude being adequate for welding and the arc current to said work at said second magnitude being substantially lower and being adequate for terminating a weld crater-free.

References Cited by the Examiner
UNITED STATES PATENTS

| | | | |
|---|---|---|---|
| 2,152,785 | 4/1939 | Blankenbuehler | 219—135 |
| 2,351,083 | 6/1944 | Tyrner | 315—299 |
| 2,433,678 | 12/1947 | Tyrner | 315—299 |
| 2,464,679 | 3/1949 | Fletcher et al. | 219—131 |

RICHARD M. WOOD, *Primary Examiner.*

ANTHONY BARTIS, *Examiner.*